(12) United States Patent  
Gangi

(10) Patent No.: US 9,111,082 B2  
(45) Date of Patent: Aug. 18, 2015

(54) SECURE ELECTRONIC IDENTIFICATION DEVICE

(71) Applicant: Joseph M Gangi, Providence, RI (US)

(72) Inventor: Joseph M Gangi, Providence, RI (US)

(*) Notice: Subject to any disclaimer, the term of this patent is extended or adjusted under 35 U.S.C. 154(b) by 51 days.

(21) Appl. No.: 13/902,834

(22) Filed: May 26, 2013

(65) Prior Publication Data

US 2013/0339747 A1   Dec. 19, 2013

Related U.S. Application Data

(60) Provisional application No. 61/652,165, filed on May 26, 2012.

(51) Int. Cl.
| | |
|---|---|
| G06F 21/00 | (2013.01) |
| G06F 21/34 | (2013.01) |
| G06F 21/32 | (2013.01) |
| G06F 9/00 | (2006.01) |
| G06F 21/62 | (2013.01) |
| H04L 9/32 | (2006.01) |

(52) U.S. Cl.
CPC ............... *G06F 21/34* (2013.01); *G06F 21/32* (2013.01); *G06F 21/6245* (2013.01); *G06F 2221/2111* (2013.01); *H04L 9/3234* (2013.01)

(58) Field of Classification Search
CPC ..... G06F 21/34; G06F 21/31; G06F 21/6245; H04L 9/3234
USPC .......................................................... 713/185
See application file for complete search history.

(56) References Cited

U.S. PATENT DOCUMENTS

| 7,353,990 | B2 * | 4/2008 | Elliot et al. .................... 235/380 |
| 7,472,833 | B2 * | 1/2009 | Justin ............................ 235/492 |
| 8,393,535 | B1 * | 3/2013 | Yee ................................ 235/380 |
| 8,468,576 | B2 * | 6/2013 | Doman et al. ..................... 726/1 |
| 2002/0095389 | A1 * | 7/2002 | Gaines ............................ 705/67 |
| 2002/0099665 | A1 * | 7/2002 | Burger et al. .................... 705/67 |
| 2003/0154138 | A1 * | 8/2003 | Phillips et al. .................. 705/26 |
| 2004/0111739 | A1 * | 6/2004 | Winegard ........................ 725/31 |
| 2006/0176524 | A1 * | 8/2006 | Willrich .......................... 358/474 |
| 2006/0219776 | A1 * | 10/2006 | Finn .............................. 235/380 |
| 2010/0037030 | A1 * | 2/2010 | Kassai et al. .................... 711/161 |
| 2010/0295878 | A1 * | 11/2010 | Mathea et al. ................. 345/690 |
| 2012/0313754 | A1 * | 12/2012 | Bona ............................ 340/5.82 |
| 2013/0243266 | A1 * | 9/2013 | Lazzouni ....................... 382/115 |

* cited by examiner

*Primary Examiner* — Hadi Armouche  
*Assistant Examiner* — Bryan Wright

(57) ABSTRACT

In accordance with one embodiment of the present invention a secure electronic identification device is presented. The secure electronic identification device includes a display mode for displaying government furnished information, a display mode for displaying user furnished information, and a public display mode for displaying public information.

5 Claims, 3 Drawing Sheets

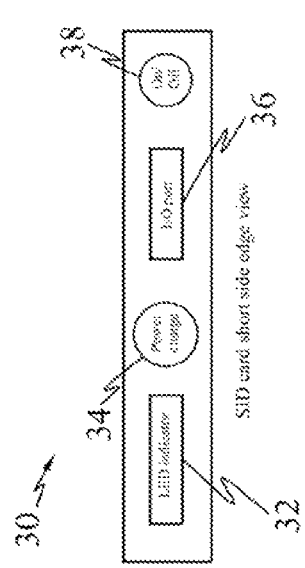
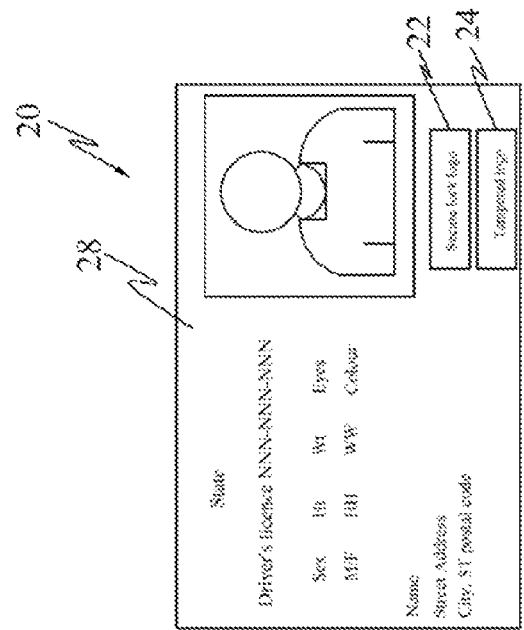
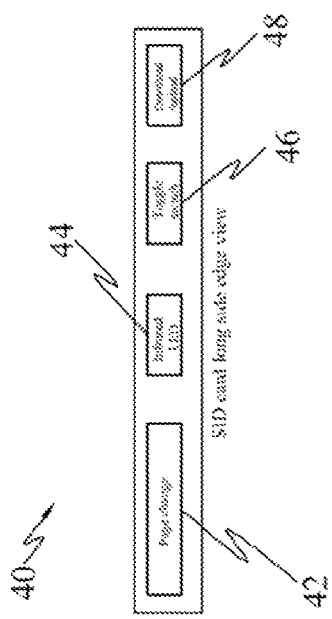
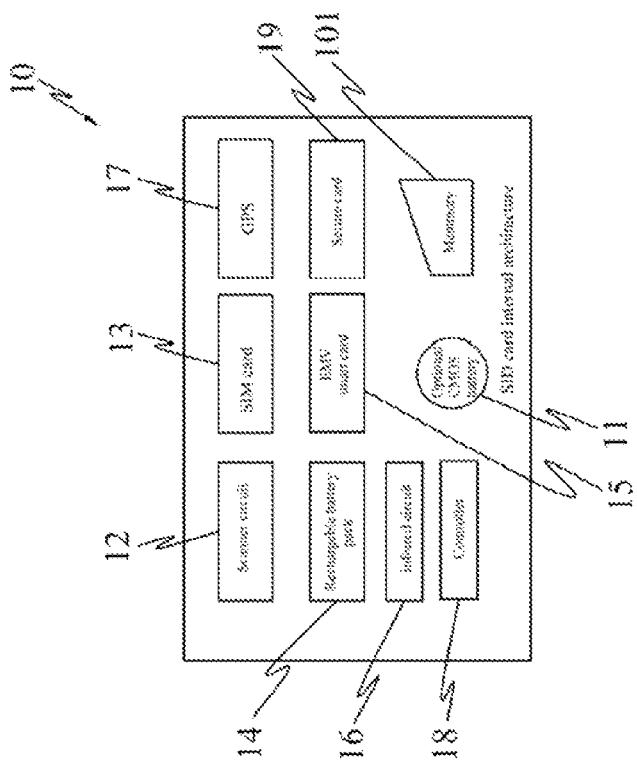

SECURE ELECTRONIC IDENTIFICATION DEVICE

CROSS-REFERENCE TO RELATED APPLICATIONS

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith:

U.S. provisional patent application 61/652,165 entitled "Secure Identification Card (SID-C) System", naming Joseph M. Gangi as inventor, filed 2 May 2012.

BACKGROUND

1. Field of Use

The presently disclosed subject matters relates to Identification cards, mobile applications, and mobile devices such as mobile phones, Personal Digital Assistants (PDAs), iPods, tablet computers, laptop computers, and similar mobile devices. More particularly, the subject matter relates to a secure identification card (SID-C) which can be used at any type of terminal equipped with a magnetic stripe reader or a short range wireless communication capability.

2. Description of Prior Art (Background)

Authentication of an individual's identity is a fundamental component of physical and logical access control processes. A wide range of mechanisms is employed to authenticate identity, utilizing various classes of identity credential. For physical access, individual identity has traditionally been authenticated by use of paper or other non automated, hand-carried credentials, such as driver's licenses and badges. Access authorization to computers and data has traditionally been authenticated through user-selected passwords. More recently, cryptographic mechanisms and biometric techniques have been used in physical and logical security applications, replacing or supplementing the traditional credentials.

The strength of the authentication that is achieved varies, depending upon the type of credential, the process used to issue the credential, and the authentication mechanism used to validate the credential. This specification establishes a standard for a Secure Identification Card (SID-C) system based on secure and reliable forms of identification credentials issued and maintained by a state or local government entity. The SIC-C is intended to authenticate an individual's identification.

Homeland Security Presidential Directive 12 [HSPD 12], signed by the President on Aug. 27, 2004, established the requirements for a common identification standard for identification credentials issued by Federal departments and agencies to Federal employees and contractors (including contractor employees) for gaining physical access to Federally controlled facilities and logical access to Federally controlled information systems. HSPD 12 directs the Department of Commerce to develop a Federal Information Processing Standards (FIPS) publication to define such a common identification credential. In accordance with HSPD 12, the FIPS standard defines the technical requirements for the identity credential that—

Is issued based on sound criteria for verifying, an individual employee's identity Is strongly resistant to identity fraud, tampering, counterfeiting, and terrorist exploitation Can be rapidly authenticated electronically Is issued only by providers whose reliability has been established by an official accreditation process.

The FIPS standard defines authentication mechanisms offering varying degrees of security. Federal departments and agencies determine the level of security and authentication mechanisms appropriate for their applications. The ID cards issued by the Federal government are generally referred to as Common Access Cards or CAC cards.

However, CAC cards require a master database or locally stored active directory coupled with a Personal Identification Number (PIN) in order to determine a user's ID. In addition, CAC cards do not provide a user accessible area to store other user data, such as driver license numbers or a public area to store data such medical alert data in the event of an emergency. CAC cards do not provide a GPS locator feature.

In addition, CAC cards require sophisticated printing techniques in order to provide visual authentication that the card has not been tampered with; e.g., CAC security features include, at a minimum;

Optical varying structures

Optical varying inks

Laser etching and engraving

Holograms

Holographic images

Watermarks.

It will be appreciated that incorporating printed security features such as watermarks, holographic images, etc., is expensive and time consuming. Moreover, once of these features has been compromised it is not a simple matter to recall and reprint security cards implementing the compromised security feature.

It is desirable, therefore, to provide a secure identification card having multiple access areas. It is also desirable to provide a secure identification card having GPS locator capability.

BRIEF SUMMARY

The foregoing and other problems are overcome, and other advantages are realized, in accordance with the presently preferred embodiments of these teachings.

The SID-C invention is directed towards a durable plastic enclosure with a visible touch screen capability (capacitive or resistive) and a GPS transmitter. The SID-C Card has a credit card-size form factor, with one or more embedded integrated circuit Chips (ICC) that provide memory capacity and computational capability. The SID-C Card is the primary component of the SID-C system. The holder uses the SID-C for authentication. The SID-C has three primary data storage areas: a user storage area for storing user Personal Identification Information (PII) data; as public area accessible for storing emergency data such as medical information in the event of an emergency; and a secure storage area accessible only by a government agency. PII data may include any suitable information defined to be personal information, addresses, phone numbers, age, etc.

One of the primary features of the SID-C will be fingerprint recognition initiation for authenticating owner's private data such as driver's license and/or identification card, social security card, and the ability to upload individual's personal medical records. The driver's license portion in itself will be a secure upload only available through an office of legal authority.

Therefore, fingerprint registration is accomplished when the government identification is uploaded to the device. This is a separate application and secure upload from any other personal data, therefore, keeping certain records, such as, for example, secure driver's license, protected through government encryption technology.

The SID-C contains GPS 911 tracking, for multiple purposes, for example, loss of unit. A web site or toll free number with password or biometric user verification can be used to access information regarding, the location of the device. Finally, it could have an interactive alert feature for emergency purposes.

In accordance with one embodiment of the present invention a secure electronic identification device is provided. The device includes a housing having a display on an outer side of the housing for displaying selected public, government, or user supplied data in the form of images representing public, government, or user cards, such as, for example, driver's license, social security cards, permits, library cards, credit cards, bank cards, and store cards. The secure electronic identification device also provides an inner circuit, placed inside the housing, for providing communication and display functions. In addition, the secure electronic identification device includes at least one secure memory area accessible by government systems for storing the government furnished information. Also included are at least one user-secured memory area for storing the user furnished information and at least one public memory area for storing the public information. The secure electronic identification device also includes a bistable electrophoretic display or an LED display for displaying the government, user, or public information. The aforementioned inner circuit includes the logic and resources to minimize display power consumption. In addition, the aforementioned inner circuit also includes the logic and resources to verify the source or authenticity of the government, user, or public furnished information. Also included in the secure electronic identification device is an LED or I/O port for transmitting or receiving the government, user, or public furnished information. The I/O port may be a powered USB port for charging the secure electronic identification device.

In accordance with one embodiment of the present invention a secure electronic identification device is provided. The device includes a housing having a display on an outer side of the housing for displaying selected public, government, or user supplied data in the form of images representing public, government, or user cards, such as, for example, driver's license, social security cards, permits, library cards, credit cards, bank cards, and store cards. The secure electronic identification device also provides an inner circuit, placed inside the housing, for providing communication and display functions. In addition, the secure electronic identification device includes at least one secure memory area accessible by government systems for storing the government furnished information. Also included are at least one user-secured memory area for storing the user furnished information and at least one public memory area for storing the public information. The inner circuit further comprises an EMV Smart Card for implementing a global standard for inter-operation of integrated circuit cards (SIC cards or "chip cards") and IC card capable point of sale (POS) terminals and automated teller machines (ATMs), for authenticating credit and debit card transactions; a subscriber identification module (SIM) for storing a mobile subscriber identity and related key for identification and authentication; and a global positioning satellite (GPS) module for locating the securable electronic identification device. The inner circuit also includes a secure card for access by a government system for identity proofing; and registration; a memory area for storing the government, public, or user information; and a controller for controlling access to, including encrypting or decrypting, the government, public, or user information. The device also includes logic and resources for comparing and evaluating PINs and/or biometric data stored within the securable electronic identification device with biometric data presented by a user. Biometric data may be any suitable biometric data, such as, for example, fingerprints, retinal scans, or voice recognition.

The invention is also directed towards a securable electronic identification device for displaying government furnished information selected from the group consisting of government issued, for example, driver's license, social security card, identification card, and permit license. In addition, the device displays user information selected from the group consisting of, for example, credit card, health insurance card, bank card, library card, and store card.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 is a pictorial illustration of the internal configuration of the SID-C in accordance with the present invention;

FIG. 2 is a pictorial illustration of the present invention in Driver's License node in accordance the teachings of the present invention shown in FIG.

FIG. 3 is a pictorial illustration of a long side edge view of the SID-C in accordance with the invention shown in FIG. 1;

FIG. 4 is a pictorial illustration of a short side edge view of the SID-C in accordance with the invention shown in FIG. 1;

DETAILED DESCRIPTION

Figure 5:
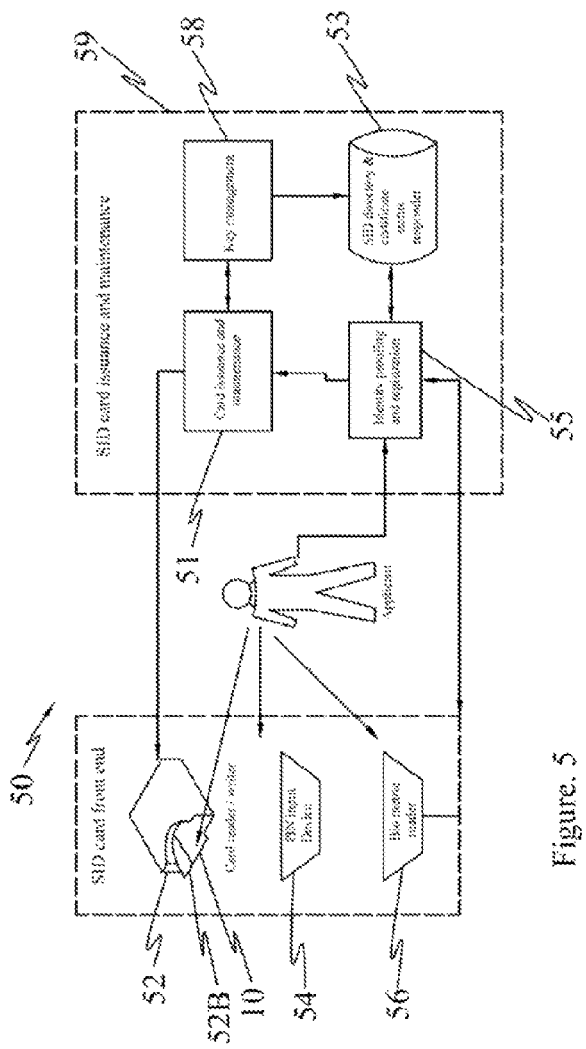
FIG. 5 is an illustration of the notional model for the operational SID-C system in accordance with the present invention shown in FIG. 1.

The following brief definition of terms shall apply throughout the application:

The term "outer" or "outside" refers to a direction away from a user, while the term "inner" or "inside" refers to a direction towards a user;

The term "comprising" means including but not limited to, and should be interpreted in the manner it is typically used in the patent context;

The phrases "in one embodiment," "according to one embodiment," and the like generally mean that the particular feature, structure, or characteristic following, the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example; and If the specification states a component or feature "may," "can," "could," "should," "preferably," "possibly," "typically," "optionally," "for example," or "might" (or other such language) be included or have a characteristic, that particular component or feature is not required to be included or to have the characteristic;

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting, characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

An operational SID-C system in accordance with the present invention is logically divided into the following three major subsystems;

SID-C Front-End Subsystem—SID-C card and biometric readers, and personal identification number (PIN) input device. The SID-C cardholder interacts with these components to gain physical or logical access to the desired resource such as SID-C issuance and management subsystem.

SID-C Issuance and Management Subsystem—the components responsible for identity proofing and registration, card and key issuance and management, and the various repositories and services (e.g., public key infrastructure [PKI] directory; certificate status servers required as part of the verification infrastructure.

SID card for storing user information, public information, and secure government information in memory sections having different read/write permissions. The SID card also contains a GPS locator and view screen. The SID card will be discussed in more detail herein.

Referring to FIG. 1 there is shown a pictorial illustration of the internal configuration of the SID-C 10 in accordance with the present invention. It will be understood throughout that SID-C is an electronic device with a credit card form factor and may be referred to as SID-C or SID Card. The internal configuration of the SID-C includes a scanner circuit 12; a SIM card 13, a GPS module 17; a rechargeable battery pack 14, an EMV smart card 15, a secure card 19; an infrared circuit 16, a controller 18; an optional CMOS battery 11; and a memory location area 101 partitionable into multiple areas having different read/write access controls and encryption features.

Still referring to FIG. 1, the scanner circuit 12 provides the circuitry necessary for scanning 1-D or 2-D barcodes. The scanning circuitry may be any suitable circuitry such as, for example, camera imaging and processing or laser scanning and processing. The scanning circuitry 12 may also be adapted to function as a biometric device, such as, for example, a fingerprint scanner for identification purposes.

Still referring to FIG. 1, the SID Card 10 also includes a Subscriber Identity Module (SIM) card 13. The subscriber identity module or subscriber identification module (SIM) 13 is an integrated circuit that securely stores an International Mobile Subscriber Identity (IMSI) and the related, key used to identify and authenticate subscribers on mobile telephony devices (such as mobile phones and computers). The SIM card 13 contains its unique serial number (ICCID), international mobile subscriber identity (IMSI), security authentication and ciphering information, temporary information related to the local network, a list of the services the user has access to and two passwords: a personal identification number (PIN) for ordinary use and a personal unblocking code (PUK) for PIN unlocking.

Still referring to FIG. 1, the SID Card 10 also includes GPS circuitry 17 for geographically localizing the location of the SID Card 10. Localization information may be transmitted to suitable locations such as emergency locator systems and also displayed on the SID-C 10 screen.

The SID-C 10 includes a rechargeable battery pack 14 for powering the onboard circuitry. The rechargeable battery pack 14 may be fixed or removable. The SID-C 10 also includes an optional CMOS battery 11 such as a lithium coin cell for backup power to critical circuits; such as the GPS circuitry 17, and the onboard real-time-clock (RTC) or system clock (not shown).

Still referring to FIG. 1, the SID-C 10 also includes an Europay-MasterCard-Visa (EMV) smart card 15 feature. The EMV smart card 15 implements a global standard for inter-operation of integrated circuit cards IC cards or "chip cards") and IC card capable point of sale (POS) terminals and automated teller machines (ATMs), for authenticating credit and debit card transactions.

Also shown in FIG. 1 is a secure card 19 for access by a government agency for identity proofing, and registration discussed in more detail herein.

The SID-C 10 also includes a controller 18 for controlling the various functions of the SID-C 10 including page or mode changing, infrared communications, download/upload commands, power maintenance, data bus control and on/off functions.

The controller 18 also controls access to the memory section 101. The memory section 101 is partitioned into at least three distinct areas: user accessible area, public accessible area, and government accessible area. The memory section 101 may be any suitable non-volatile memory such as flash memory.

Referring also to FIG. 2 there is shown a pictorial illustration of the present invention in Driver's License mode 20 in accordance the teachings of the present invention shown in FIG. 1. In this mode the user's driver's license 20 is shown on the SID-C 10 display area 28. The display area 28 may be any suitable type display, including, but not limited to, a touch screen such as a capacitive touch screen or a resistive touch screen. For power considerations, the SID-C 10 display area 28 may also be a suitable non-touch screen such as an LCD type screen, e.g., TFT-LCD or IPS-LCD. Similarly, the SID-C 10 display area 28 may also be a suitable non-touch screen such as an Organic Light Emitting Diode or OLED, e.g., AMOLED or Super AMOLED.

It will be further understood that the user may make any of the display modes private, e.g., only accessible by the user; or, public, e.g., accessible by emergency personnel.

It will be further understood that certain data ma be accessible by authorized personnel, e.g., police personnel in the performance of their duties, irrespective of the user set permissions. For example, upon surrendering the SID-C 10 to police personnel the police personnel may access the driver's license mode to visually view driver license information. Alternatively, the police personnel, or any authorized personnel may electronically query, via the infrared circuitry 16, the SID-C 10 to obtain certain information, e.g., driver's license information, electronically.

As will be discussed herein it will be appreciated that certain data displayed in certain modes may only be stored on the SID-C via an authorized encryption process. It will be further understood that attempts to tamper with encrypted data will result in permanent disabling of the "secure lock logo" 22 displayed in all display modes displaying encrypted or government furnished data. Permanent disabling the "secure lock logo" will result in the displaying of the "tampered logo" 24, thereby alerting a user or other authorized personnel that the SID-C has been compromised and is no longer valid.

Referring also to FIG. 3, there is shown a short edge view 30 of the SID Card 10 shown in FIG. 1. Optional is an LED indicator 32 for status indication such as on/off. Also shown is a power charge indicator 34 for indicating the power charge status of the rechargeable battery pack 14 shown in FIG. 1.

FIG. 3 also shows an Input/Output port 36. The I/O port may be any suitable port for downloading or uploading information to the SID-C 10. The I/O port 36 may also be any suitable port for concurrently charging the rechargeable battery pack shown in FIG. 1. For example, the I/O port 36 may be a universal serial bus (USB) rechargeable port.

FIG. 3 also shows the on/off switch 38 for down powering the SID-C device 10. It will be appreciated that the SID-C device power management schemes may include multiple power management schemes for conserving, battery life. For example, one power management scheme could turn off all displays after a pre-determined time.

Referring also to FIG. 4 there is shown a long edge view 40 of the SID Card 10 shown in FIG. 1. Page/mode 42 change button changes the SID Card 10 display. The SID Card display may display multiple icons representing the various modes available and are highlighted and selected by the page/mode change button. As discussed earlier, suitable display modes may include a driver's license mode. Optionally, the SID Card 10 may incorporate the features of the page/mode change button 42 to be included as a soft key feature available via the SID Card 10 display area 28.

Still referring to FIG. 4 there is shown the infrared LED 44 for communication with other infrared communication devices. Also shown in FIG. 4 is a toggle switch 46 or button. The toggle switch 46 may be used separately, or in conjunction, with the page/mode display 42 or other soft keys via the SID Card touch screen 28 to toggle between various modes and screens.

Still Referring to FIG. 4 there is shown the upload/download switch 48. The upload/download switch 48 is used to direct the data flow from or to the SID Card.

Referring also to FIG. 5 there is shown an illustration of the notional model for the operational SID-C system 50 in accordance with the present invention shown in FIG. 1. The identity proofing, and registration component 55 in FIG. 5 refers to the process of collecting, storing, and maintaining all information and documentation that is required for verifying and assuring the applicant's identity. Various types of identifying information may collected from the applicant at the time of registration; for example, but not limited to, birth certificate, biometric data.

The card issuance and maintenance component 51 deals with the personalization of the logical aspects of the card at the time of issuance and maintenance thereafter. This includes not only image downloads, names, and other information on the SID Card, but also loading the relevant card applications, biometrics, and other data. A user supplied PIN via PIN input device 54 and/or user biometric data via Bio Metric reader 56 is used to control the ability to unlock the SID Card 10 by the cardholder and then display the embedded credentials for authentication purposes. Also shown in FIG. 5 is encoding strip 52B. Encoding strip may be any suitable encoding strip such as, but not limited to, a magnetic coding strip, a bar code, or any other suitable non-volatile encoding.

The key management 58 component is responsible for the generation of key pairs, the issuance and distribution of digital certificates containing the public key of the cardholder, and management and dissemination of certificate status information.

The key management component 58 is used throughout the life cycle of the SID Card 10—from generation and loading of authentication keys and PKI credentials, to usage of these keys for secure operations, to eventual renewal, reissuance, or termination of the card. The key management component 58 is also responsible for the provisioning of government accessible, or other suitable repositories and services (such as PKI directories and certificate status responders), that provide information to the requesting application about the status of the PKI credentials.

Figure 6:
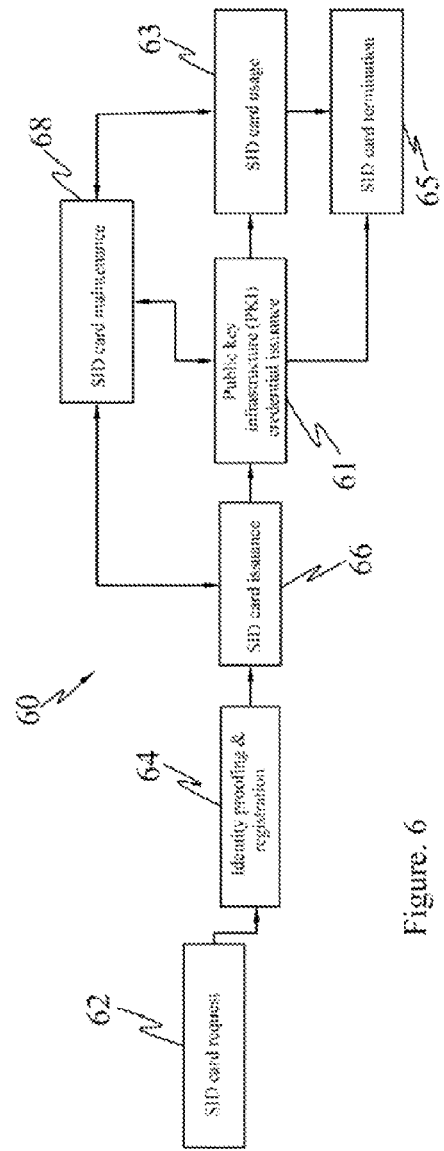
FIG. 6 is a method flow chart illustrating one process for SID-C issuance and management in accordance with the present invention shown in FIG. 5.

Referring also to FIG. 6 there is shown a method flow chart 60 illustrating one process for SID-C issuance and management in accordance with the present invention shown in FIG. 5:

SID Card Request 62. This activity applies to the initiation of a request for the issuance of an electronic SID Card 10 to an applicant and the validation of this request.

Identity Proofing and Registration 64. The goal of this activity is to verify the claimed identity of the applicant and that the entire set of identity source documents presented at the time of registration is valid.

SID Card Issuance 66. This activity deals with the personalization (physical and logical) of the card and the issuance of the card to the intended applicant.

PKI Credential Issuance 61. This activity deals with generating logical credentials and loading, them onto the SID Card 10.

SID Card Usage 63. During this activity, the SID Card 10 is used to perform cardholder authentication for access to a logical resource such as a secure memory location within the SID-C 10. Access authorization decisions are made after successful cardholder identification and authentication.

SID Card Maintenance 68. This activity deals with the maintenance or update of the physical card and the data stored thereon. Such data includes various card applications, PIN, PKI credentials, and biometrics.

SID Card Termination 65. The termination process is used to permanently destroy or invalidate the SID Card and the data and keys needed for SID-C 10 authentication so as to prevent any future use of the card for SID-C 10 authentication.

Figure 7:
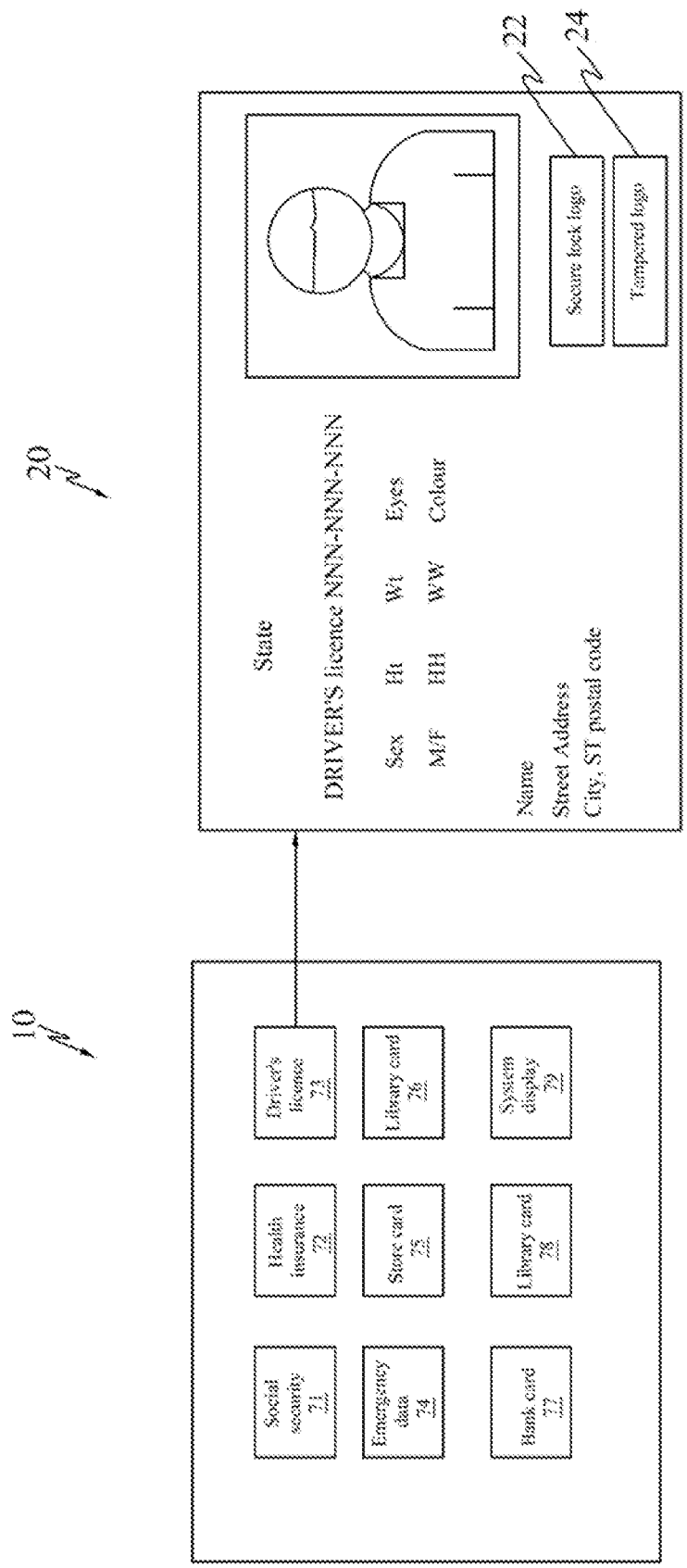
FIG. 7 is another pictorial illustration of the present invention in Driver's License mode in accordance the teachings of the present invention shown in FIG. 1.

Referring also to FIG. 7 there is shown another pictorial illustration of the present invention in Driver's License mode in accordance the teachings of the present invention shown in FIG. 1. It will be understood that the SID-C 10 display modes may include, in addition to the driver's license 20 display mode 73, a social security card display mode 71, a credit card display mode 77, a medical information display mode 74, or any other suitable display mode, such as for example, a library card 78, another library card 76, a store card 75, or health insurance 72. Other examples include gun permits, licenses such as hunting or fishing licenses, voter registration cards, insurance cards, and passport information.

Although an exemplary embodiment of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. For example, the secure identification card (SID-C) system will also have the ability to perform card holder processing or self-processing (id pay technology). Cardholder will have the ability to process a payment request from their SID-C device to the card issuer (i.e. bank, credit card Company, or bank account). The cardholder will have biometric ID and password on file and predetermined priority payment assignment selected. This will be on the with selected processor thus allowing, for speed pay through id pay technology. This unique biometric identification and password will be in the data trail approving each and every transaction assuring and guaranteeing that the transaction could only have been initiated or can only be initiated through the correct biometric identification of the card holder. Once the processor receives requested amount by card holder, a unique bar code with identifier for the predetermined amount with payee approval code will display for merchant scan or print. The SID-C device in idle state, the home page, can display the various user name and simple user data. Page 2, in this example, can be your navigation directory. This will be where you find various programs, or modes, such as ED directory, health directory, and ID pay directory, as well as the ability for user to create private directories for secure protection. Once you get to the ID pay technology screen, icon functions such as pay now, money transfers, history, dollar amount to process, and a numerical keypad may be displayed. Upon submitting you will be prompted into screen 3 for bio-authentication; requesting either optic or finger print and numerical keypad for password. You will hit the submit button to request payment transaction. This ID pay technology creates a new paradigm shift in the credit card processing industry for extreme high security in credit card processing and protection of precious data. This eliminates to ever having to give or present a physical credit card to any merchant or anyone for any reason since payments are processed through the processor of the individual card holder.

What is claimed is:

1. A securable electronic identification device comprising:
a housing, comprising: a display, on the outer of the housing, for displaying an image;
an inner circuit, adaptable to fit inside the housing, for providing communication and display functions, wherein the inner circuit further comprises:
a secure card for access by a government system for identity proofing and registration, wherein the identity proofing and registration comprises government stored biometric data;
memory area for storing the government, public or user information,
a controller for controlling access to the government, public, or user information and for encrypting or decrypting the government, public or user information,
logic for comparing and evaluating a personal identification number (PIN) stored within the securable electronic identification device with a PIN presented by a user, wherein the securable electronic identification device secure card for access by a government system for identity proofing and registration further comprises a government stored PIN;
a display, electrically connected to the inner circuit, for displaying communication information;
a selectable government display mode for displaying, government furnished information;
at least one secure memory area accessible by government systems for storing the government furnished information,
a selectable user display mode for displaying user furnished information;
and at least one user-secured memory area for storing the user furnished information.

2. The securable electronic identification device as in claim 1, wherein the inner circuit further comprises an EMV Smart Card for implementing a global standard for inter-operation of integrated circuit cards (IC cards or "chip cards") and IC card capable point of sale (POS) terminals and automated teller machines (ATMs), for authenticating credit and debit card transactions.

3. The securable electronic identification device as in claim 2 wherein the inner circuit further comprises a subscriber identification module (SIM) for storing a mobile subscriber identity and related key for identification and authentication.

4. The securable electronic identification device as in claim 3 wherein the inner circuit further comprises a global positioning satellite (GPS) module for locating the securable electronic identification device.

5. The securable electronic identification device as in claim 3 wherein the securable electronic identification device further comprises logic and resources for comparing and evaluating biometric data stored within the securable electronic identification device with biometric data presented by a user.

* * * * *